United States Patent
Seguchi

(10) Patent No.: US 11,502,562 B2
(45) Date of Patent: Nov. 15, 2022

(54) FIELD COIL TYPE ROTATING ELECTRIC MACHINE

(71) Applicant: DENSO CORPORATION, Kariya (JP)

(72) Inventor: Masahiro Seguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/201,714

(22) Filed: Mar. 15, 2021

(65) Prior Publication Data
US 2021/0226489 A1 Jul. 22, 2021

Related U.S. Application Data

(63) Continuation of application No. PCT/JP2019/034474, filed on Sep. 2, 2019.

(30) Foreign Application Priority Data

Sep. 27, 2018 (JP) .............................. JP2018-182965

(51) Int. Cl.
*H02K 1/24* (2006.01)
*H02K 3/487* (2006.01)
(Continued)

(52) U.S. Cl.
CPC ............... *H02K 1/24* (2013.01); *H02K 1/246* (2013.01); *H02K 3/487* (2013.01); *H02K 19/12* (2013.01);
(Continued)

(58) Field of Classification Search
CPC ............ H02K 1/22; H02K 1/24; H02K 1/246; H02K 1/26; H02K 3/48; H02K 3/487; H02K 19/12; H02K 19/26; H02K 2213/03
(Continued)

(56) References Cited

U.S. PATENT DOCUMENTS

2012/0256510 A1* 10/2012 Yamada ................. H02K 19/12
310/184
2013/0106229 A1 5/2013 Goto et al.
(Continued)

FOREIGN PATENT DOCUMENTS

JP    S5582050 U    6/1980
JP    H05-009177 U  2/1993
(Continued)

OTHER PUBLICATIONS

Nov. 26, 2019 International Search Report issued in International Patent Application No. PCT/JP2019/034474.

*Primary Examiner* — Rashad H Johnson
(74) *Attorney, Agent, or Firm* — Oliff PLC

(57) ABSTRACT

A field coil type rotating electric machine includes a stator and a rotor. The stator includes a stator core, stator teeth arranged in a circumferential direction and each radially protruding from the stator core, and a stator coil wound on the stator teeth. The rotor includes a rotor core, main poles arranged in the circumferential direction and each radially protruding from the rotor core, and a field coil wound on the main poles. Each of the stator teeth and the main poles extends in an axial direction. Each of the main poles has a pair of main-pole end portions located respectively at circumferential ends of the main pole and both radially facing the stator. For each of the main poles, in at least one of the main-pole end portions of the main pole, there is formed at least one cut for part of an axial length of the main pole.

9 Claims, 14 Drawing Sheets

(51) Int. Cl.
*H02K 19/12* (2006.01)
*H02K 19/26* (2006.01)
*H02K 1/22* (2006.01)
*H02K 3/48* (2006.01)

(52) U.S. Cl.
CPC ............... *H02K 19/26* (2013.01); *H02K 1/22* (2013.01); *H02K 3/48* (2013.01); *H02K 2213/03* (2013.01)

(58) Field of Classification Search
USPC ........................................ 310/179–181, 184
See application file for complete search history.

(56) References Cited

U.S. PATENT DOCUMENTS

| | | | |
|---|---|---|---|
| 2014/0285057 A1* | 9/2014 | Aoyama | H02K 19/12 310/210 |
| 2015/0171681 A1 | 6/2015 | Goto et al. | |
| 2019/0207491 A1* | 7/2019 | Seguchi | H02K 3/48 |
| 2019/0312539 A1 | 10/2019 | Seguchi et al. | |
| 2020/0373822 A1* | 11/2020 | Seguchi | H02K 11/049 |
| 2021/0167645 A1* | 6/2021 | Nashiki | H02K 3/12 |

FOREIGN PATENT DOCUMENTS

| | | |
|---|---|---|
| JP | 2000-166198 A | 6/2000 |
| JP | 2003070218 A | 3/2003 |
| JP | 2003-324872 A | 11/2003 |
| JP | 2008178211 A | 7/2008 |
| JP | 2011-019335 A | 1/2011 |
| WO | 2014024023 A2 | 2/2014 |

\* cited by examiner $\left( \ast \dfrac{1}{3}\beta < \theta nt < \dfrac{2}{3}\beta \right)$ (a) FUNDAMENTAL CURRENT (b) HARMONIC CURRENT (c) RESULTANT CURRENT

FIG.12
| PATTERN | | 1 | 2 | 3 | 4 |
|---|---|---|---|---|---|
| DIRECTIONS OF INDUCED VOLTAGES | e1 (71a) | ↑ | ↓ | ↑ | ↓ |
| | e2 (71b) | ↑ | ↑ | ↓ | ↓ |
FIG.13A
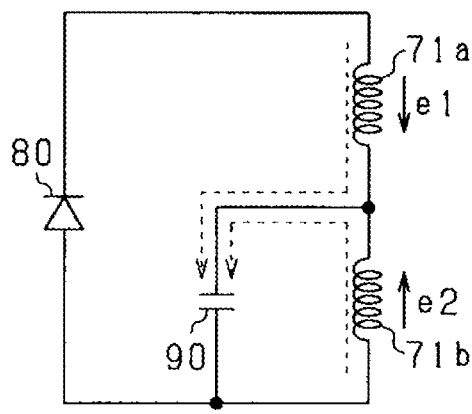
FIG.13B
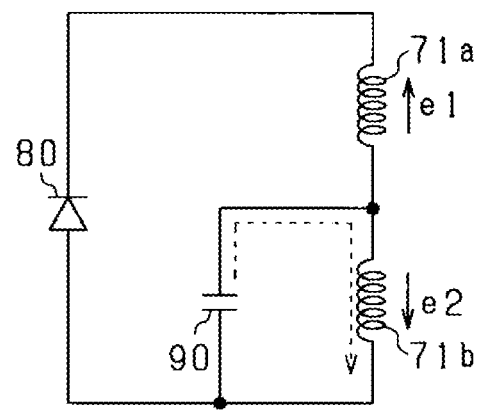

US 11,502,562 B2

FIELD COIL TYPE ROTATING ELECTRIC MACHINE

CROSS-REFERENCE TO RELATED APPLICATIONS

The present application is a continuation application of International Application No. PCT/JP2019/034474 filed on Sep. 2, 2019, which is based on and claims priority from Japanese Patent Application No. 2018-182965 filed on Sep. 27, 2018. The contents of these applications are hereby incorporated by reference in their entirety into the present application.

BACKGROUND

1. Technical Field

The present disclosure relates to field coil type rotating electric machines.

2. Description of Related Art

There are known field coil type rotating electric machines which include a stator and a rotor. The stator includes a stator core, a plurality of stator teeth arranged in a circumferential direction and each radially protruding from the stator core, and a stator coil wound on the stator teeth. The rotor includes a rotor core, a plurality of main poles arranged in the circumferential direction and each radially protruding from the rotor core toward the stator side, and a field coil wound on the main poles. In addition, each of the stator teeth and the main poles extends in an axial direction.

In operation, field current flows through the field coil, causing the field coil to be excited and thereby generating magnetic flux. The generated magnetic flux flows through a magnetic circuit which includes the rotor core, the main poles, the stator teeth and the stator core. Consequently, torque is generated with the magnetic flux flowing through the magnetic circuit and electric current flowing through the stator coil.

SUMMARY

According to the present disclosure, there is provided a field coil type rotating electric machine which includes a stator and a rotor. The stator includes a stator core, a plurality of stator teeth arranged in a circumferential direction and each radially protruding from the stator core, and a stator coil wound on the stator teeth. The rotor includes a rotor core, a plurality of main poles arranged in the circumferential direction and each radially protruding from the rotor core toward the stator side, and a field coil wound on the main poles. Each of the stator teeth and the main poles extends in an axial direction. Each of the main poles has a pair of main-pole end portions that are located respectively at opposite circumferential ends of the main pole and both radially face the stator. For each of the main poles, in at least one of the main-pole end portions of the main pole, there is formed at least one cut for part of an axial length of the main pole.

BRIEF DESCRIPTION OF THE DRAWINGS

FIG. 12 is a table illustrating patterns of voltages induced in first and second windings of a field coil of the field coil type rotating electric machine.

FIGS. 13A and 13B are schematic circuit diagrams illustrating the flow of electric currents induced in the first and second windings of the field coil, the electric currents corresponding to the patterns 2 and 3 shown in FIG. 12.

DESCRIPTION OF EMBODIMENTS

Figure 1:
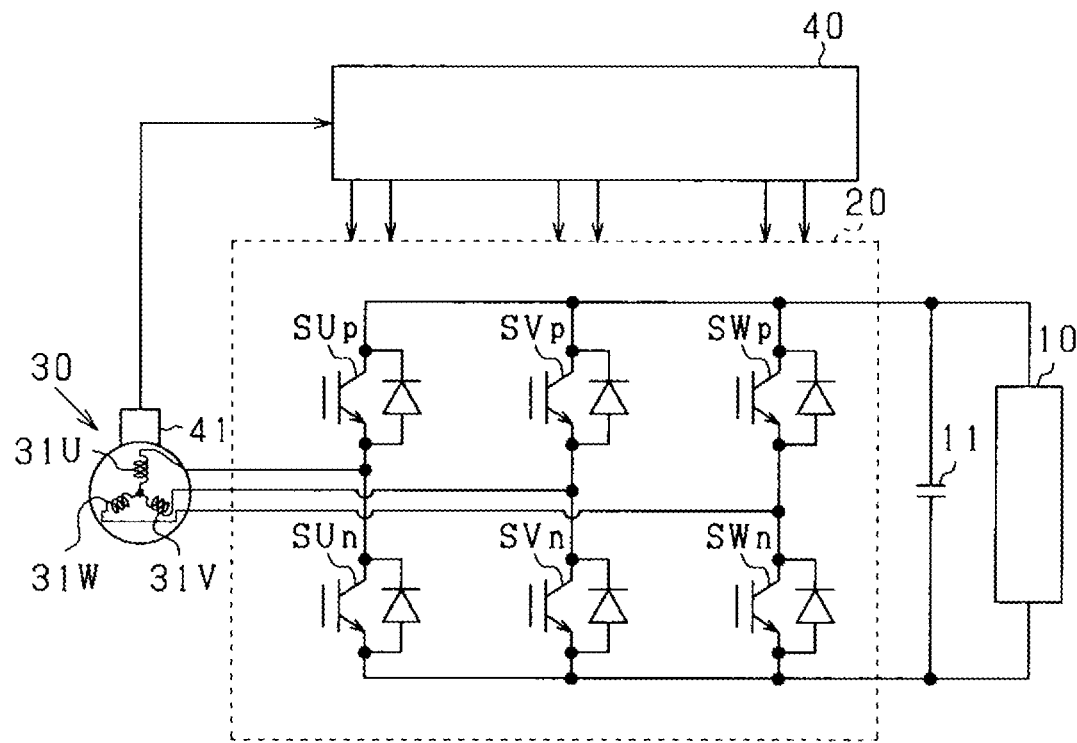
FIG. 1 is an overall configuration diagram of a rotating electric machine system which includes a field coil type rotating electric machine according to a first embodiment.

The inventor of the present application has found that the field coil type rotating electric machines known in the art (see, for example, Japanese Patent Application Publication No. JP 2008-178211 A) involve the following problems.

Hereinafter, for the sake of convenience of explanation, both circumferential end portions of each of the main poles which radially face the stator will be referred to as the main-pole end portions. The stator has a plurality of slots each of which is formed between one circumferentially-adjacent pair of the stator teeth and opens on the rotor side in a radial direction. During rotation of the rotor, when the main-pole end portions come to positions where they radially face corresponding ones of the slots of the stator, the magnetic flux flowing through the main poles and the stator teeth will be interrupted, reducing the amount of magnetic flux flowing through the magnetic circuit. Moreover, when the main-pole end portions come to positions where they radially face corresponding ones of the stator teeth, the interrupted magnetic flux will again flow through the main poles and the stator teeth, increasing the amount of magnetic flux flowing through the magnetic circuit. With repetition of such increase and decrease in the amount of magnetic flux flowing through the magnetic circuit, variation in the torque of the rotating electric machine will be increased, thereby increasing the torque ripple of the rotating electric machine. Consequently, the NV (Noise and Vibration) characteristics of the rotating electric machine may be degraded.

In contrast, in the above-described field coil type rotating electric machine according to the present disclosure, for each of the main poles, in at least one of the main-pole end portions of the main pole, there is formed at least one cut for part of the axial length of the main pole. Therefore, for the at least one of the main-pole end portions, it is possible to offset the timings at which one or more parts of the main-pole end portion where the at least one cut is formed radially face the slots of the stator from the timings at which one or more parts of the main-pole end portion where no cut is formed radially face the slots of the stator. Consequently, it becomes possible to have first torque ripple and second torque ripple canceled by each other; the first torque ripple is generated due to the one or more parts of the main-pole end portion where the at least one cut is formed while the second torque ripple is generated due to the one or more parts of the main-pole end portion where no cut is formed. As a result, it becomes possible to reduce the torque ripple of the entire rotating electric machine.

Exemplary embodiments will be described hereinafter with reference to the drawings. It should be noted that for the sake of clarity and understanding, identical components having identical functions throughout the whole description have been marked, where possible, with the same reference numerals in the drawings and that for the sake of avoiding redundancy, descriptions of identical components will not be repeated.

First Embodiment

FIG. 1 shows the overall configuration of a rotating electric machine system which includes a field coil type rotating electric machine 30 according to the first embodiment.

As shown in FIG. 1, the rotating electric machine system further includes a DC power supply 10, an inverter 20 and a controller 40 in addition to the rotating electric machine 30.

The rotating electric machine 30 is a field coil type synchronous rotating electric machine. More particularly, in the present embodiment, the controller 40 controls the rotating electric machine 30 to function as an ISG (Integrated Starter Generator) or an MG (Motor Generator). In addition, the rotating electric machine 30, the inverter 20 and the controller 40 may be either integrated into a single drive apparatus or configured as individual components.

Figure 2:
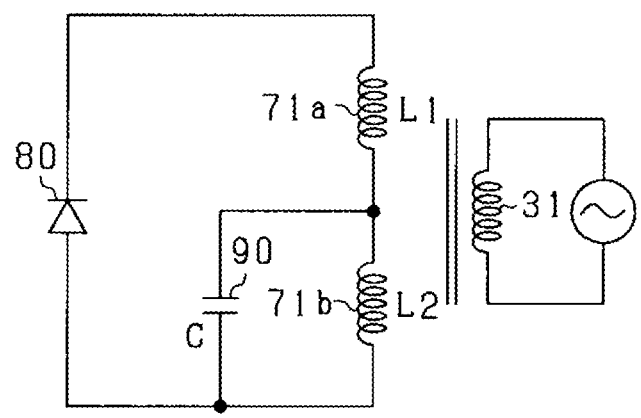
FIG. 2 is a schematic diagram illustrating an electric circuit formed in a rotor of the field coil type rotating electric machine.
Figure 3:
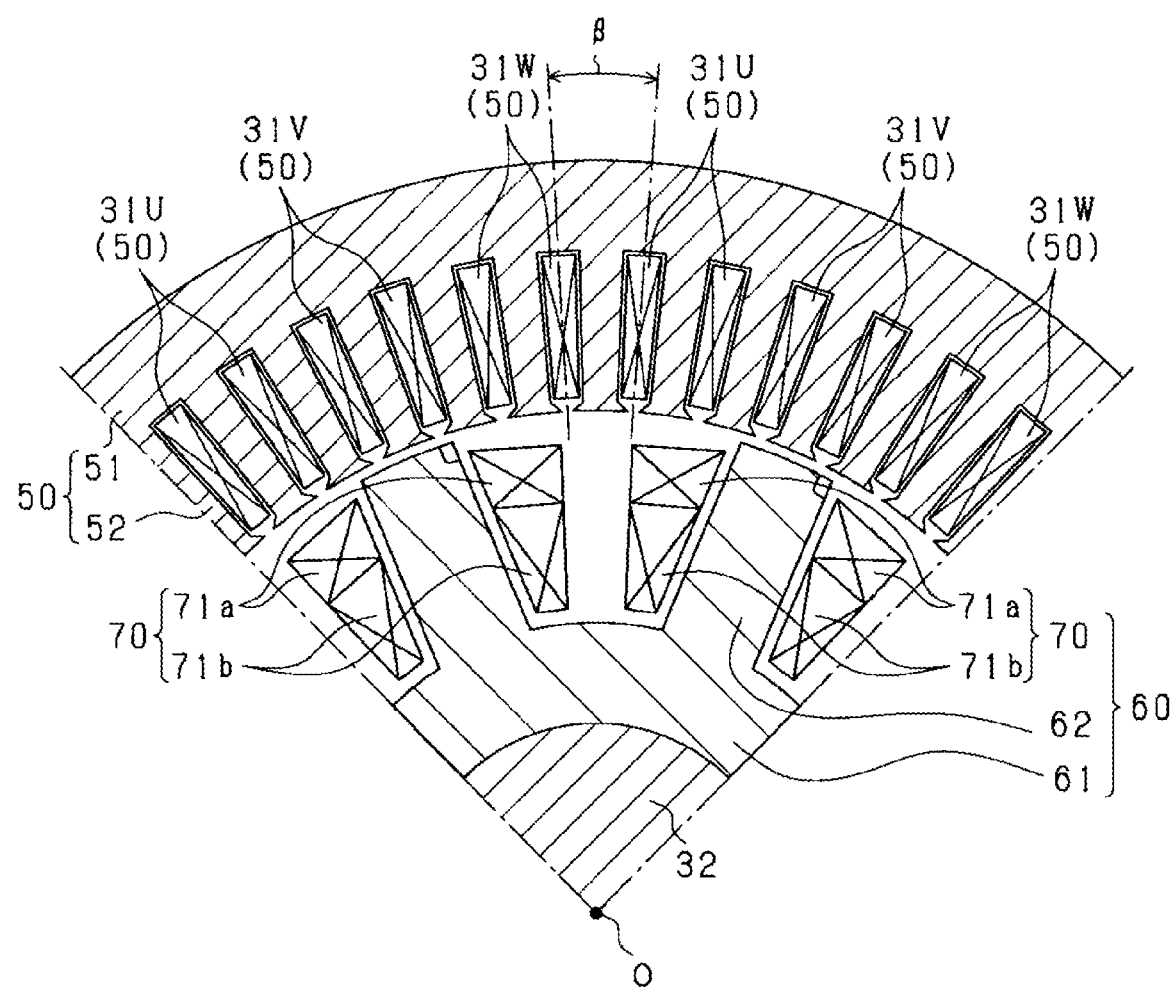
FIG. 3 is a transverse cross-sectional view of both part of the rotor and part of a stator of the field coil type rotating electric machine.
Figure 4:
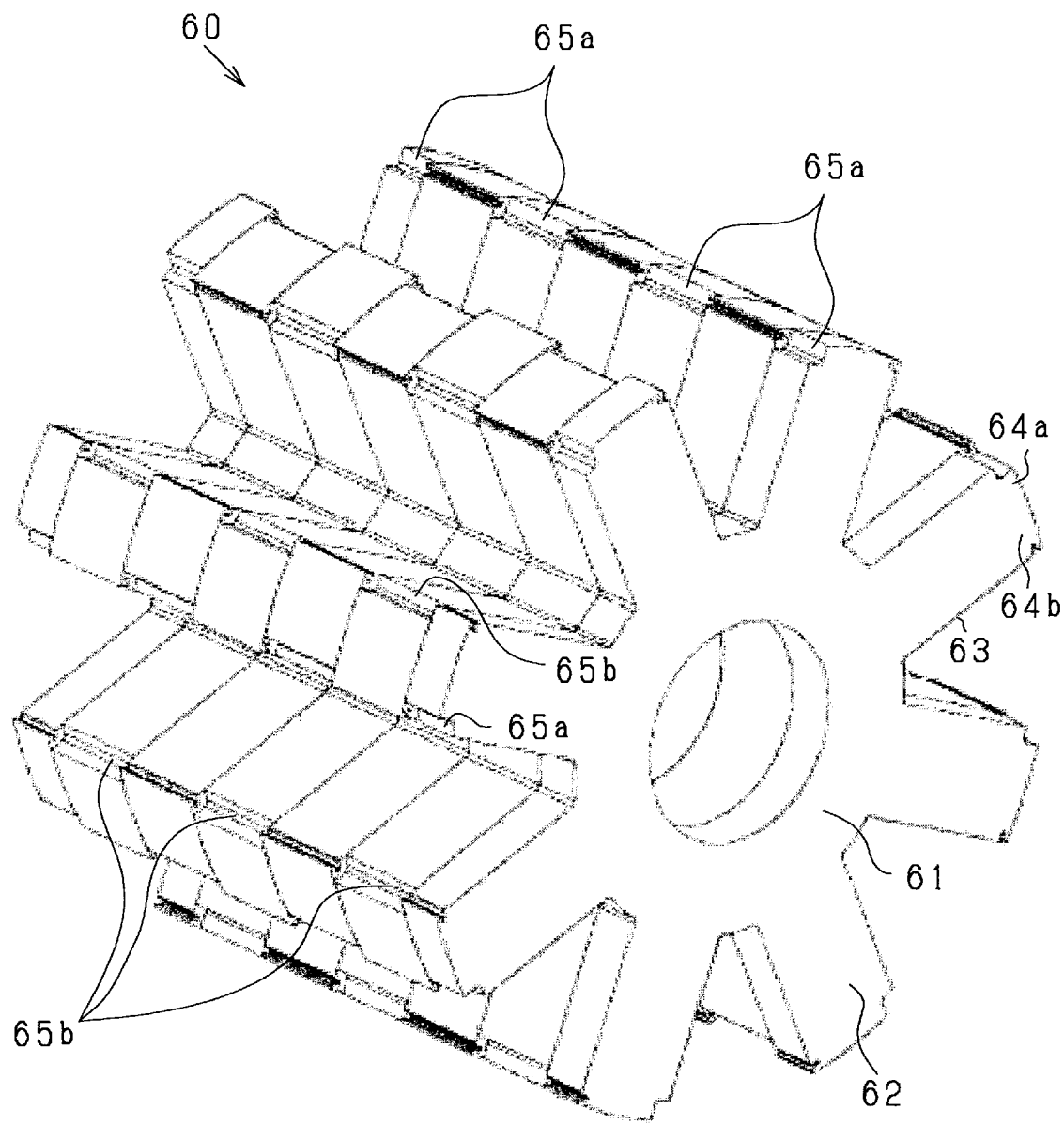
FIG. 4 is a perspective view of the rotor.

As shown in FIG. 3, the rotating electric machine 30 includes a rotor 60 having a field coil 70. In the present embodiment, as shown in FIGS. 2 and 3, the field coil 70 is constituted of a serially-connected winding pair consisting of a first winding 71a and a second winding 71b that are connected in series with each other. The field coil 70 is formed by, for example, compression shaping to improve the space factor and the ease of assembly thereof. Moreover, the field coil 70 is formed, for example, of aluminum wires. The specific gravity of aluminum wires is relatively low. Therefore, forming the field coil 70 with aluminum wires, it is possible to lower the centrifugal force during rotation of the rotor 60. In addition, aluminum wires are lower in both strength and hardness than copper wires. Therefore, aluminum wires are suitable for being compression-shaped.

The rotating electric machine 30 also includes a stator 50 having a stator coil 31. The stator coil 31 is formed, for example, of copper wires. As shown in FIGS. 1 and 3, the stator coil 31 includes a U-phase winding 31U, a V-phase winding 31V and a W-phase winding 31W, which are arranged to be offset from each other by 120° in electrical angle.

As shown in FIG. 1, the inverter 20 includes a serially-connected U-phase switch pair consisting of a U-phase upper-arm switch SUp and a U-phase lower-arm switch SUn, a serially-connected V-phase switch pair consisting of a V-phase upper-arm switch SVp and a V-phase lower-arm switch SVn, and a serially-connected W-phase switch pair consisting of a W-phase upper-arm switch SWp and a W-phase lower-arm switch SWn.

To a junction point between the U-phase upper-arm and lower-arm switches SUp and SUn, there is connected a first end of the U-phase winding 31U of the stator coil 31. To a junction point between the V-phase upper-arm and lower-arm switches SVp and SVn, there is connected a first end of the V-phase winding 31V of the stator coil 31. To a junction point between the W-phase upper-arm and lower-arm switches SWp and SWn, there is connected a first end of the W-phase winding 31W of the stator coil 31. A second end of the U-phase winding 31U, a second end of the V-phase winding 31V and a second end of the W-phase winding 31W are connected together to defined a neutral point therebetween. That is, in the present embodiment, the U-phase, V-phase and W-phase windings 31U, 31V and 31W of the stator coil 31 are star-connected.

In addition, in the present embodiment, each of the switches SUp, SVp, SWp, SUn, SVn and SWn is implemented by an IGBT (Insulated-Gate Bipolar Transistor). Moreover, each of the switches SUp, SVp, SWp, SUn, SVn and SWn has a freewheeling diode connected in antiparallel thereto.

Each of the U-phase, V-phase and W-phase upper-arm switches SUp, SVp and SWp has its collector connected to a positive terminal of the DC power supply 10. Each of the U-phase, V-phase and W-phase lower-arm switches SUn, SVn and SWn has its emitter connected to a negative terminal of the DC power supply 10. In addition, a smoothing capacitor 11 is connected in parallel with the DC power supply 10.

The rotating electric machine system further includes an angle detection unit 41. The angle detection unit 41 is configured to output an angle signal indicative of a rotation angle of the rotor 60 of the rotating electric machine 30. The angle signal outputted from the angle detection unit 41 is inputted to the controller 40.

Next, the configuration of the stator 50 and the rotor 60 of the rotating electric machine 30 will be described in detail with reference to FIGS. 2 and 3.

As shown in FIG. 3, both the stator 50 and the rotor 60 are arranged coaxially with a rotating shaft 32. Hereinafter, the direction in which a central axis O of the rotating shaft 32 extends will be referred to as the axial direction; the directions of extending radially from the central axis O of the rotating shaft 32 will be referred to as radial directions; and the direction of extending along a circle whose center is on the central axis O of the rotating shaft 32 will be referred to as the circumferential direction.

The stator 50 is formed by laminating a plurality of soft-magnetic steel sheets in the axial direction. The stator 50 includes an annular stator core 51 and a plurality of stator teeth 52 arranged in alignment with each other in the circumferential direction and each protruding radially inward from the stator core 51. Between each circumferentially-adjacent pair of the stator teeth 52, there is formed one slot. More particularly, in the present embodiment, the stator 50 has a total of 48 stator teeth 52 formed at equal intervals in the circumferential direction; accordingly, the number of the slots is also equal to 48. In addition, each of the U-phase, V-phase and W-phase windings 31U, 31V and 31W of the stator coil 31 is wound on the stator teeth 52 in a distributed winding manner or a concentrated winding manner.

In the present embodiment, each of the stator teeth 52 is configured to have a pair of collar portions formed at a radially inner end (or distal end) thereof; the collar portions extend respectively toward opposite sides in the circumferential direction. However, it should be noted that each of the stator teeth 52 may alternatively have no collar portions formed at the radially inner end thereof.

Moreover, in the present embodiment, each of the slots is formed between one circumferentially-adjacent pair of the stator teeth 52 so as to open on the radially inner side (i.e., on the rotor 60 side in the radial direction). In FIG. 3, β represents one slot pitch which is the angular interval between each circumferentially-adjacent pair of the slots. In addition, in the present embodiment, each of the slots has its radially-extending centerline (shown with a one-dot chain line in FIG. 3) passing through the central axis O of the rotating shaft 32.

The rotor 60 is also formed by laminating a plurality of soft-magnetic steel sheets in the axial direction. The rotor 60 includes a cylindrical rotor core 61 and a plurality of main poles 62 arranged in alignment with each other in the circumferential direction and each protruding radially outward from the rotor core 61 (i.e., each radially protruding from the rotor core 61 toward the stator 50 side). Distal end surfaces (or radially outer end surfaces) of the main poles 62 radially face distal end surfaces (or radially inner end surfaces) of the stator teeth 52. More particularly, in the present embodiment, the rotor 60 has a total of eight main poles 62 formed at equal intervals in the circumferential direction.

On each of the main poles 62 of the rotor 60, the first winding 71a of the field coil 70 is wound on the radially outer side (i.e., the stator side) while the second winding 71b of the field coil 70 is wound on the radially inner side (i.e., the non-stator side). That is, the first winding 71a is located closer to the stator 50 (i.e., more radially outward) than the second winding 71b is. Moreover, on each of the main poles 62, the first and second windings 71a and 71b are wound in the same direction. Furthermore, for each circumferentially-adjacent pair of the main poles 62, the winding direction of the first and second windings 71a and 71b on one of the main poles 62 of the circumferentially-adjacent pair is opposite to the winding direction of the first and second windings 71a and 71b on the other of the main poles 62 of the circumferentially-adjacent pair. Consequently, the magnetization directions of the main poles 62 of the circumferentially-adjacent pair are opposite to each other.

FIG. 2 shows an electric circuit formed in the rotor 60 that has the first and second windings 71a and 71b of the field coil 70 wound on the same main poles 62. In the rotor 60, there are provided a diode 80 as a rectifying element and a capacitor 90. A first end of the first winding 71a (or the first-winding-side end of the serially-connected winding pair) is connected with the cathode of the diode 80. A second end of the first winding 71a is connected with a first end of the second winding 71b. A second end of the second winding 71b (i.e., the second-winding-side end of the serially-connected winding pair) is connected with the anode of the diode 80. The capacitor 90 is connected in parallel with the second winding 71b. In addition, in FIG. 2, L1 represents the inductance of the first winding 71a; L2 represents the inductance of the second winding 71b; and C represents the capacitance of the capacitor 90.

Next, the controller 40 will be described in detail. It should be noted that part or the whole of each function of the controller 40 may be realized either by hardware such as one or more integrated circuits or by software stored in a non-transitory tangible storage medium and a computer executing the software.

The controller 40 acquires the angle signal outputted from the angle detection unit 41. Then, based on the acquired angle signal, the controller 40 generates drive signals for turning on/off the switches SUp, SVp, SWp, SUn, SVn and SWn of the inverter 20.

Specifically, when driving the rotating electric machine 30 to function as an electric motor, to convert DC power outputted from the DC power supply 10 into AC power and supply the resultant AC power to the U-phase, V-phase and W-phase windings 31U, 31V and 31W of the stator coil 31, the controller 40 generates drive signals for turning on/off the switches SUp, SVp, SWp, SUn, SVn and SWn and outputs the generated drive signals to the gates of the switches SUp, SVp, SWp, SUn, SVn and SWn. Moreover, when driving the rotating electric machine 30 to function as an electric generator, to convert AC power outputted from the U-phase, V-phase and W-phase windings 31U, 31V and 31W of the stator coil 31 into DC power and supply the resultant DC power to the DC power supply 10, the controller 40 generates drive signals for turning on/off the switches SUp, SVp, SWp, SUn, SVn and SWn and outputs the generated drive signals to the gates of the switches SUp, SVp, SWp, SUn, SVn and SWn.

Figure 8:
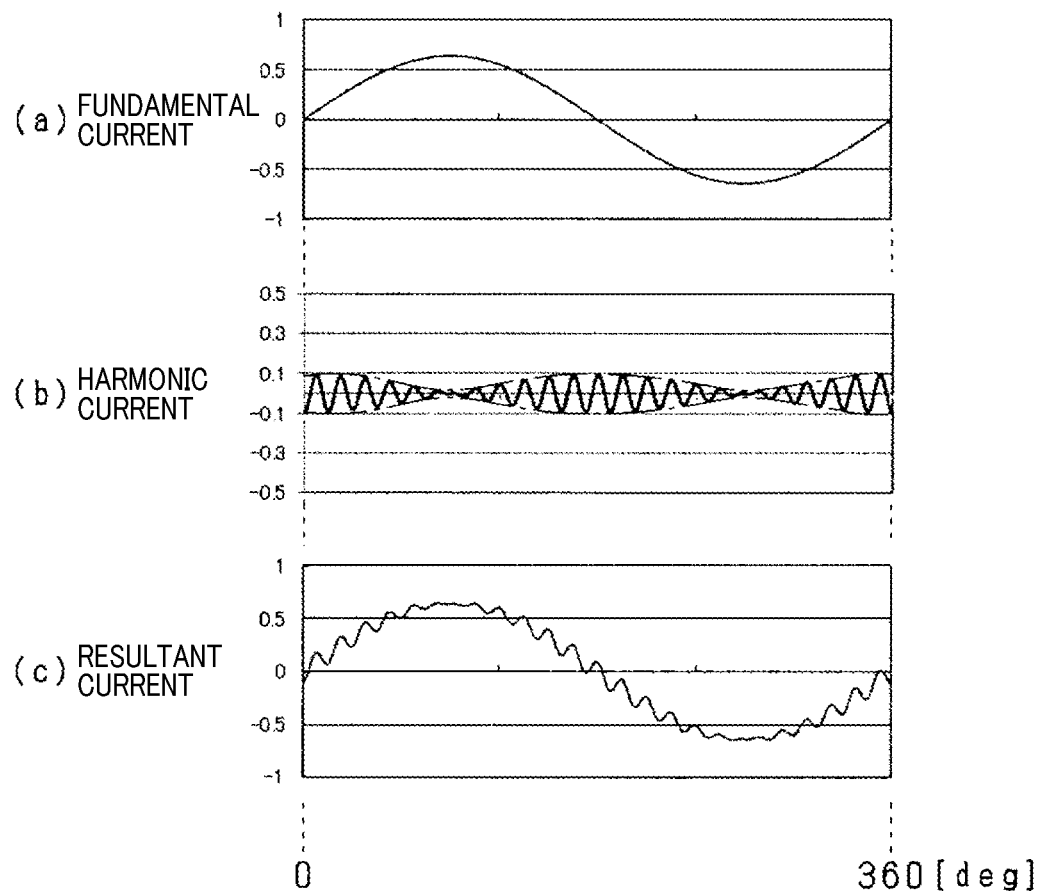
FIG. 8 is a waveform chart illustrating the waveforms of fundamental current, harmonic current and resultant current supplied to each phase winding of a stator coil of the stator according to the first embodiment.

In the present embodiment, the controller 40 turns on/off the switches SUp, SVp, SWp, SUn, SVn and SWn of the inverter 20 to supply each of the U-phase, V-phase and W-phase windings 31U, 31V and 31W of the stator coil 31 with resultant current which is the resultant of fundamental current and harmonic current. As shown in FIG. 8(a), the fundamental current is electric current mainly for causing the rotating electric machine 30 to generate torque. As shown in FIG. 8(b), the harmonic current is electric current mainly for exciting the field coil 70. As shown in FIG. 8(c), the resultant current is the resultant of the fundamental current and the harmonic current and supplied as phase current to each of the U-phase, V-phase and W-phase windings 31U, 31V and 31W of the stator coil 31. In addition, the vertical axis in FIG. 8 is graduated to indicate the relationship in magnitude between the fundamental current, the harmonic current and the resultant current.

Figure 9:
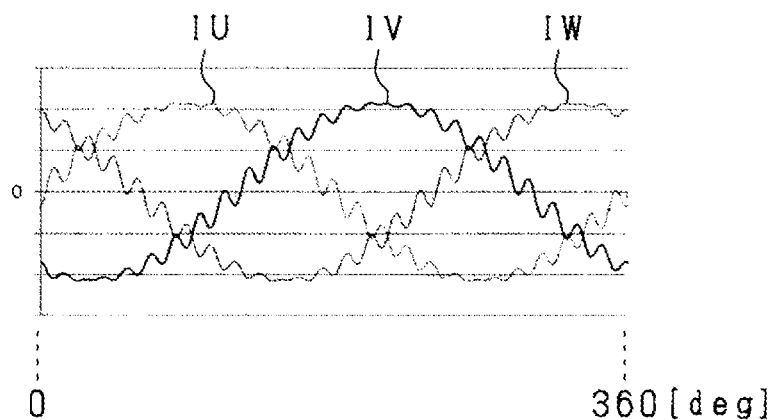
FIG. 9 is a waveform chart illustrating the waveform of three-phase alternating current supplied to the stator coil according to the first embodiment.

As shown in FIG. 9, U-phase, V-phase and W-phase currents IU, IV and IW, which are supplied respectively to the U-phase, V-phase and W-phase windings 31U, 31V and 31W of the stator coil 31, are offset in phase from each other by 120° in electrical angle.

In the present embodiment, as shown in FIGS. 8(a) and (b), the period of the envelope of the harmonic current is set to be ½ of the period of the fundamental current. The envelope of the harmonic current is designated by a one-dot chain line in FIG. 8(b). Moreover, the timings at which the envelope of the harmonic current reaches its peak values are offset from the timings at which the fundamental current reaches its peak values. More specifically, the timings at which the envelope of the harmonic current reaches its peak values coincide with the timings at which the fundamental current reaches its center of variation (i.e., 0). The controller 40 controls the amplitude and period of each of the fundamental current and the harmonic current severally.

By superimposing the harmonic current shown in FIG. 8(b) on the fundamental current shown in FIG. 8(a), it is possible to suppress increase in the maximum values of the phase currents flowing respectively in the U-phase, V-phase and W-phase windings 31U, 31V and 31W of the stator coil 31 and thus possible to bring the torque of the rotating electric machine 30 into agreement with a command torque without increasing the capacity of the inverter 20.

Figure 10:
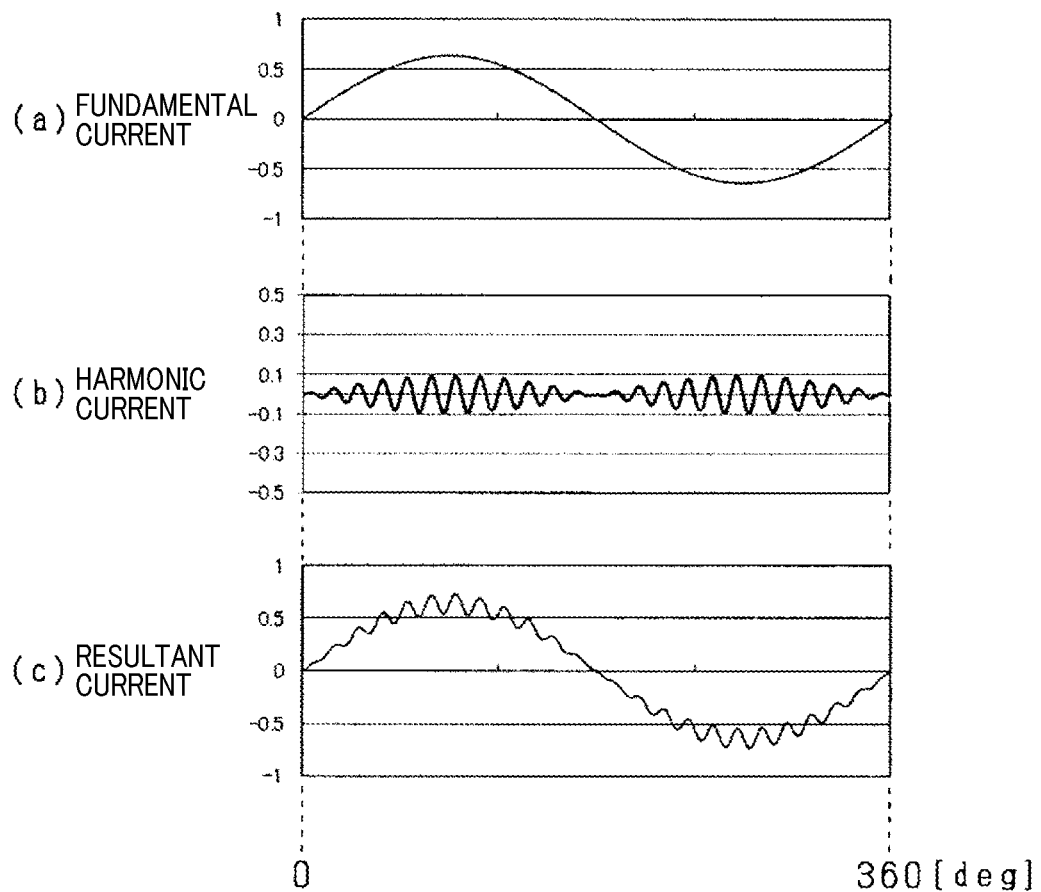
FIG. 10 is a waveform chart illustrating the waveforms of fundamental current, harmonic current and resultant current supplied to each phase winding of the stator coil according to a modification.
Figure 11:
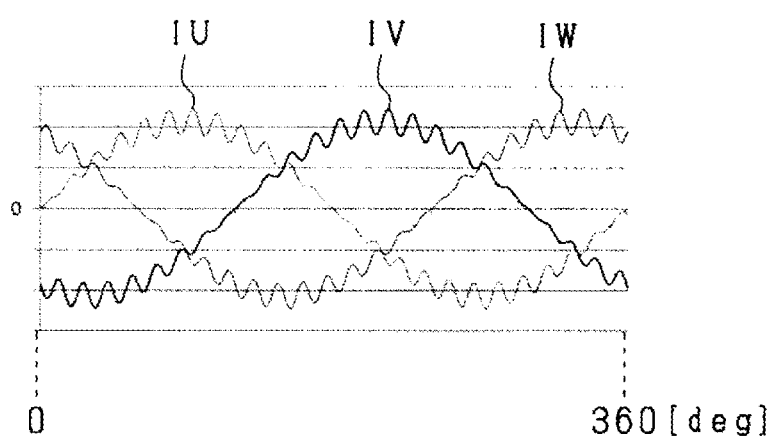
FIG. 11 is a waveform chart illustrating the waveform of three-phase alternating current supplied to the stator coil according to the modification shown in FIG. 10.

As an alternative, harmonic current shown in FIG. 10(b) may be applied instead of the harmonic current shown in FIG. 8(b). The fundamental current shown in FIG. 10(a) is identical to the fundamental current shown in FIG. 8(a). The harmonic current shown in FIG. 10(b) is offset in phase from the harmonic current shown in FIG. 8(b) by ¼ of the period of the fundamental current. The resultant current shown in FIG. 10(c) is the resultant of the fundamental current shown in FIG. 10(a) and the harmonic current shown in FIG. 10(b). In this case, as shown in FIG. 10(a) (b), the timings at which the envelope of the harmonic current reaches its peak values coincide with the timings at which the fundamental current reaches its peak values. Moreover, in this case, the U-phase, V-phase and W-phase currents IU, IV and IW, which are supplied respectively to the U-phase, V-phase and W-phase windings 31U, 31V and 31W of the stator coil 31, are as shown in FIG. 11. In addition, it is also possible to apply harmonic current whose phase is between the phase of the harmonic current shown in FIG. 8(b) and the phase of the harmonic current shown in FIG. 10(b).

In the present embodiment, the first winding 71a of the field coil 70, the capacitor 90 and the diode 80 together form a series resonant circuit. The series resonant circuit has a resonance frequency which will be referred to as the first resonance frequency f1 hereinafter. The first resonance frequency f1 can be calculated based on the inductance L1 of the first winding 71a and the capacitance C of the capacitor 90 by the following equation (eq1). Moreover, the second winding 71b of the field coil 70 and the capacitor 90 together form a parallel resonant circuit. The parallel resonant circuit has a resonance frequency which will be referred to as the second resonance frequency f2 hereinafter. The second resonance frequency f2 can be calculated based on the inductance L2 of the second winding 71b and the capacitance C of the capacitor 90 by the following equation (eq2).

$$f1 = \frac{1}{2\pi\sqrt{L1 \cdot C}} \quad \text{(eq1)}$$

$$f2 = \frac{1}{2\pi\sqrt{L2 \cdot C}} \quad \text{(eq2)}$$

Upon the harmonic current flowing in each of the U-phase, V-phase and W-phase windings 31U, 31V and 31W of the stator coil 31, the main magnetic flux varies due to harmonics; the main magnetic flux flows through a magnetic circuit that includes the main poles 62 circumferentially adjacent to one another, the rotor core 61, the stator teeth 52 and the stator core 51. With the variation in the main magnetic flux, voltages are induced respectively in the first and second windings 71a and 71b of the field coil 70, thereby inducing electric currents respectively in the first and second windings 71a and 71b. Moreover, when the voltages induced respectively in the first and second windings 71a and 71b are of the same polarity as in the patterns 1 and 4 shown in FIG. 12, the electric currents induced respectively in the first and second windings 71a and 71b are not cancelled by each other, thus increasing the total electric current induced in the field coil 70. Furthermore, the electric currents induced respectively in the first and second windings 71a and 71b are rectified by the diode 80 to flow in one direction, namely the rectification direction. Consequently, field current flows in the field coil 70 in the rectification direction, thereby exciting the field coil 70. In addition, in FIG. 12, e1 represents the voltage induced in the first winding 71a; and e2 represents the voltage induced in the second winding 71b.

On the other hand, upon the harmonic current flowing in each of the U-phase, V-phase and W-phase windings 31U, 31V and 31W of the stator coil 31, leakage magnetic flux is also generated in addition to the main magnetic flux. The leakage magnetic flux flows between each circumferentially-adjacent pair of the main poles 62 without flowing through the rotor core 61, crossing the field coil 70. Upon the leakage magnetic flux crossing the field coil 70, the voltages induced respectively in the first and second windings 71a and 71b of the field coil 70 may become opposite in polarity to each other, thereby reducing the sum of the electric currents induced respectively in the first and second windings 71a and 71b and thus the field current flowing in the field coil 70.

To solve the above problem, in the present embodiment, the capacitor 90 is connected in parallel with the second winding 71b. Consequently, when the voltages induced respectively in the first and second windings 71a and 71b are opposite in polarity to each other as in the patterns 2 and 3 shown in FIG. 12, the electric currents induced in the first and second windings 71a and 71b flow via the capacitor 90, without being canceled by each other. More specifically, as shown in FIG. 13A, both the electric current induced in the first winding 71a and the electric current induced in the second winding 71b may flow to the anode of the diode 80 via the capacitor 90. Otherwise, as shown in FIG. 13B, electric current may flow from the capacitor 90 to the anode of the diode 80 via the second winding 71b. As a result, it becomes possible to increase the field current flowing in the field coil 70.

Moreover, in the present embodiment, the frequency of the harmonic currents supplied to the phase windings 31U-31W of the stator coil 31 is set to be equal or close to the first resonance frequency f1. Consequently, it becomes possible to further increase the sum of the electric currents induced respectively in the first and second windings 71*a* and 71*b* and thus the field current flowing in the field coil 70. In addition, the first resonance frequency f1 and the second resonance frequency f2 may be set to be substantially equal (i.e., exactly or approximately equal) to each other.

Next, the configuration of the rotor 60 according to the present embodiment will be described in more detail with reference to FIGS. 3-7.

For the sake of convenience of explanation, hereinafter, for each of the main poles 62 of the rotor 60, one of two circumferential end portions of the main pole 62 which radially face the stator 50 will be referred to as the first main-pole end portion 64*a* and the other of the two circumferential end portions will be referred to as the second main-pole end portion 64*b*. That is, each of the main poles 62 has a pair of main-pole end portions 64*a* and 64*b* that are located respectively at opposite circumferential ends of the main pole 62 and both radially face the stator 50. In the present embodiment, in parts of the first main-pole end portion 64*a*, there are respectively formed first cuts 65*a* that extend in the axial direction. Similarly, in parts of the second main-pole end portion 64*b*, there are respectively formed second cuts 64*b* that extend in the axial direction. That is, in each of the main poles 62, there are formed the cuts 65*a* and 65*b* by removing (e.g., cutting off) parts of the main-pole end portions 64*a* and 64*b* from the circumferential ends of the main pole 62. Each of the cuts 65*a* and 65*b* is a cut which opens on the radially outer side (i.e. the stator 50 side in the radial direction) as well as in the circumferential direction.

Figure 7:
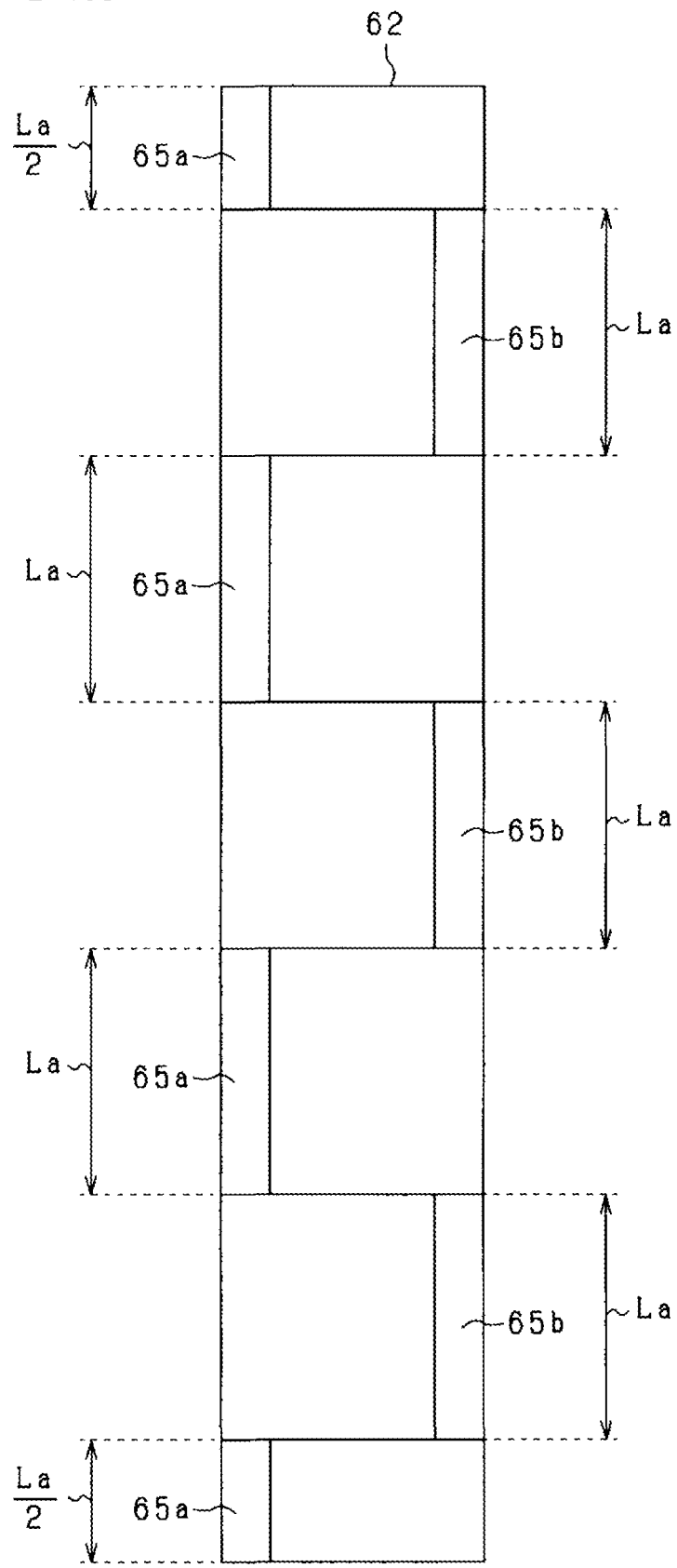
FIG. 7 is a schematic plan view illustrating the formation of the cuts in each of main poles of the rotor.

More particularly, in the present embodiment, as shown in FIG. 7, in the first main-pole end portion 64*a*, there are formed a plurality (e.g., four) of first cuts 65*a* apart from each other in the axial direction. Moreover, those of the first cuts 65*a* which are located most axially outward are formed at the axial ends of the first main-pole end portion 64*a*. On the other hand, in the second main-pole end portion 64*b*, there are formed a plurality (e.g., three) of second cuts 65*b* each of which is located between one adjacent pair of the first cuts 65*a* in the axial direction. Accordingly, in the present embodiment, in each of the main poles 62, the number of the second cuts 65*b* is less than the number of the first cuts 65*a* by one.

Moreover, in the present embodiment, when viewed along the axial direction, all the contours of the first cuts 65*a* are identical to each other. Similarly, when viewed along the axial direction, all the contours of the second cuts 65*b* are identical to each other. Furthermore, when viewed along the axial direction, the contours of the first cuts 65*a* and the contours of the second cuts 65*b* are line-symmetrical with respect to a radially-extending central axis of the main pole 62.

In the present embodiment, the rotor 60 is formed by laminating a plurality of field sheets 63 that are made of a soft-magnetic material. Each of the field sheets 63 is a sheet in which a portion for forming the rotor core 61 and portions for respectively forming the main poles 62 are integrally formed.

Figure 5A:
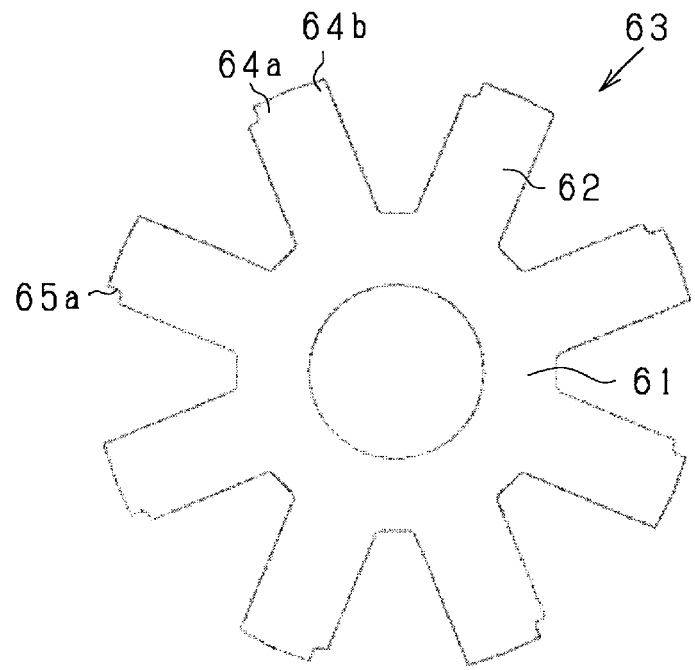
FIGS. 5A and 5B are plan views respectively showing first and second major surfaces of one of field sheets for forming the rotor.
Figure 5B:
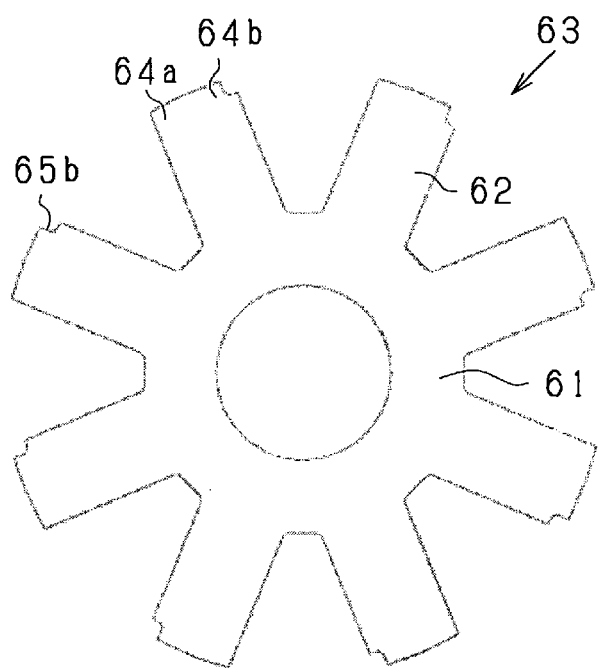

FIGS. 5A and 5B respectively show first and second major surfaces of one of the field sheets 63. In the present embodiment, the rotor 60 is formed of the field sheets 63 of a single type. More specifically, the rotor 60 is formed by stacking first field-plate groups alternately with second field-plate groups in the axial direction. Each of the first field-plate groups consists of a predetermined number of the field sheets 63 which are superposed with the first major surfaces thereof facing in a given direction. On the other hand, each of the second field-plate groups consists of a predetermined number of the field sheets 63 which are superposed with the second major surfaces thereof facing in the given direction.

In each of the field sheets 63, at a radially distal end of each of the portions for respectively forming the main poles 62, there is formed one cut. This cut corresponds to one of the first cuts 65*a* shown in FIG. 5A, and to one of the second cuts 65*b* shown in FIG. 5B.

Figure 6:
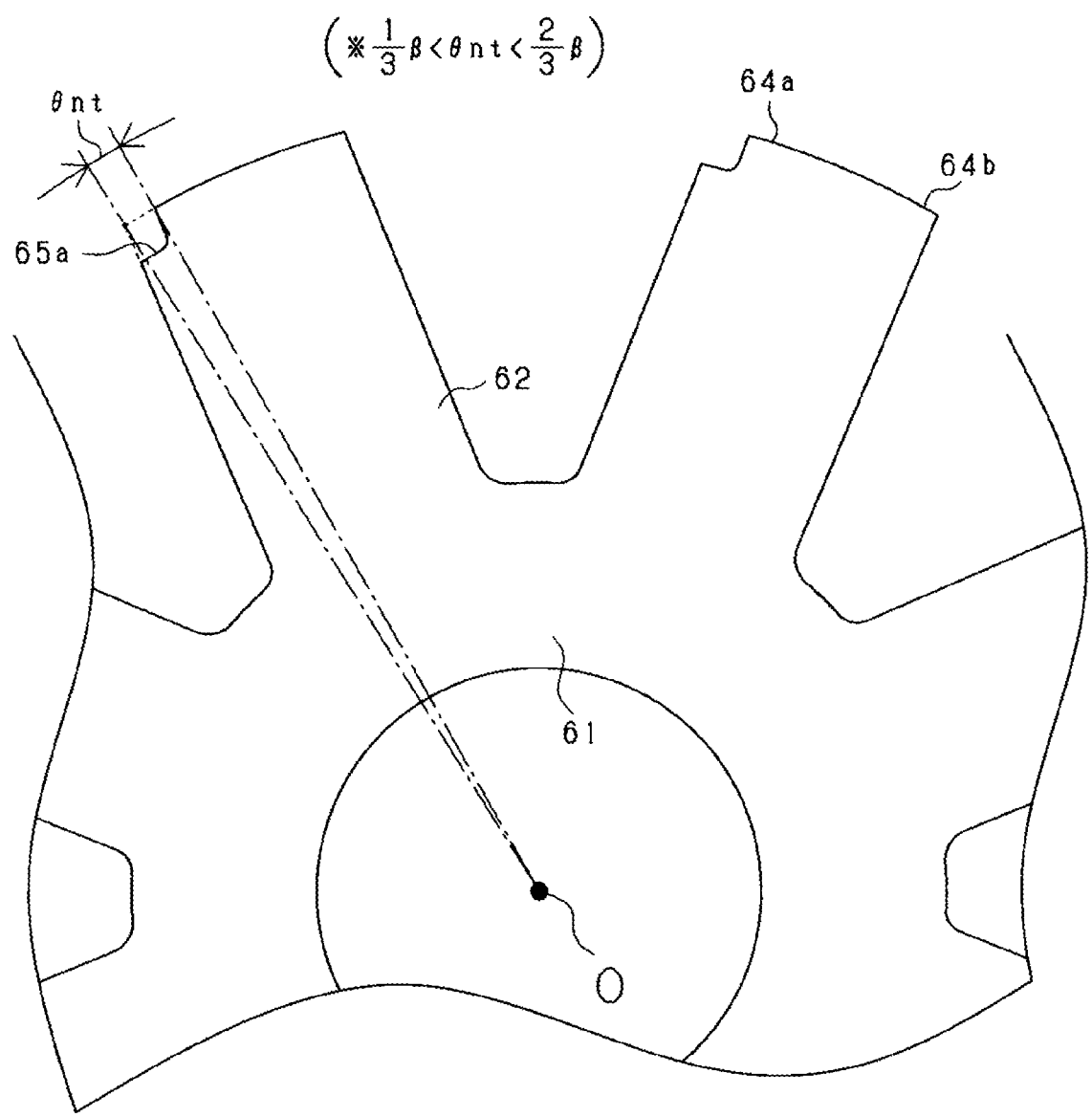
FIG. 6 is a schematic plan view illustrating the circumferential width of cuts formed in main-pole end portions of the rotor.

In the present embodiment, as shown in FIG. 6, for each of the first cuts 65*a*, a circumferential width $\theta$nt of the first cut 65*a* is set to satisfy the following dimensional relationship: $\frac{1}{3} \times \beta < \theta nt < \frac{2}{3} \times \beta$. Here, the circumferential width $\theta$nt is defined, on a plane perpendicular to the axial direction of the rotating shaft 32, as the mechanical angle between first and second imaginary lines. The first imaginary line is defined to extend straight through both the central axis O of the rotating shaft 32 and an edge of the first cut 65*a* formed on the radially outer surface of the main pole 62 which faces the stator 50. The second imaginary line is defined to extend straight through both the central axis O of the rotating shaft 32 and an edge of the first cut 65*a* formed at one circumferential end of the main pole 61. Similarly, for each of the second cuts 65*b*, a circumferential width $\theta$nt of the second cut 65*b* is also set to satisfy the dimensional relationship of ($\frac{1}{3} \times \beta < \theta nt < \frac{2}{3} \times \beta$).

The circumferential width $\theta$nt of each of the first and second cuts 65*a* and 65*b* is set as above so as to reduce the torque ripple of the rotating electric machine 30. More particularly, in the present embodiment, the circumferential width $\theta$nt is set to be equal to $\beta/2$. Consequently, it becomes possible to effectively reduce the torque ripple of the rotating electric machine 30.

In addition, the circumferential width $\theta$nt of each of the first and second cuts 65*a* and 65*b* may alternatively be set to any value other than $\beta/2$ which satisfies the dimensional relationship of ($\frac{1}{3} \times \beta < \theta nt < \frac{2}{3} \times \beta$). That is, setting the circumferential width $\theta$nt to be in the range of ($\beta \times 180°/360° \pm \beta \times 60°/360°$), it is possible to reduce the torque ripple of the rotating electric machine 30.

Moreover, in the present embodiment, as shown in FIG. 7, for each of the main poles 62, the total axial length (i.e., La/2+La+La/2=3La) of those parts of the first main-pole end portion 64*a* where the first cuts 65*a* are formed is set to be equal to the total axial length (i.e., La+La+La=3La) of those parts of the first main-pole end portion 64*a* where no first cuts 65*a* are formed. Similarly, the total axial length (i.e., La+La+La=3La) of those parts of the second main-pole end portion 64*b* where the second cuts 65*b* are formed is set to be equal to the total axial length (i.e., La/2+La+La+La/2=3La) of those parts of the second main-pole end portion 64*b* where no second cuts 65*b* are formed. This configuration is for more effectively reducing the torque ripple of the rotating electric machine 30.

Figure 14A:
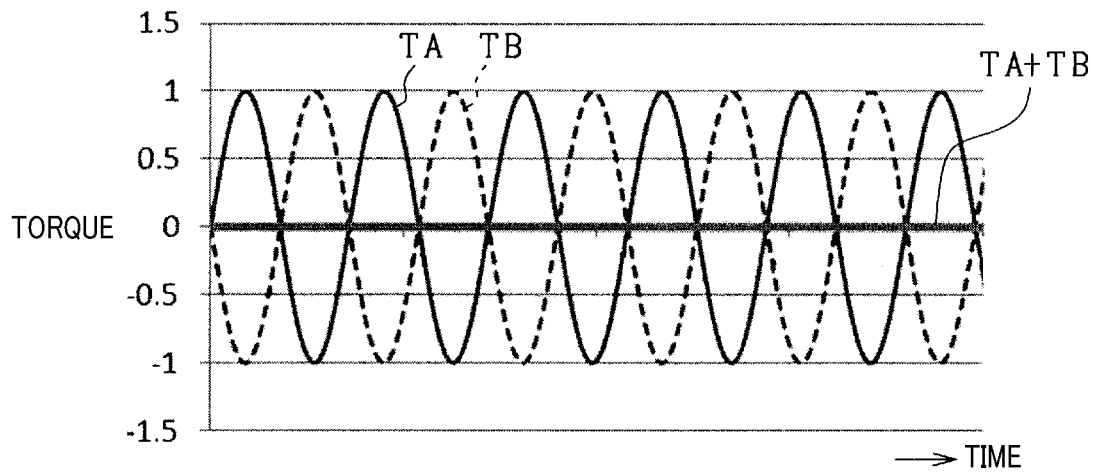
FIGS. 14A, 14B and 14C are time charts illustrating the reduction of torque ripple achieved according to the first embodiment.

FIG. 14A illustrates the reduction of torque ripple achieved according to the present embodiment. Specifically, in FIG. 14A, TA represents the change with time of the torque corresponding to those parts of the first main-pole end portions 64*a* where no first cuts 65*a* are formed; TB represents the change with time of the torque corresponding to those parts of the first main-pole end portions 64*a* where the first cuts 65*a* are formed; and TA+TB represents the change with time of the sum of the torque TA and the torque TB.

In the present embodiment, as described above, the circumferential width $\theta$nt is set to be equal to $\beta/2$ (i.e., $\theta nt = \beta/2$). Consequently, it becomes possible to offset the phases of the torques TA and TB from each other by half of one slot pitch β. As a result, it becomes possible to have the torques TA and TB canceled by each other, thereby reducing the torque ripple of the rotating electric machine 30.

Figure 14B:
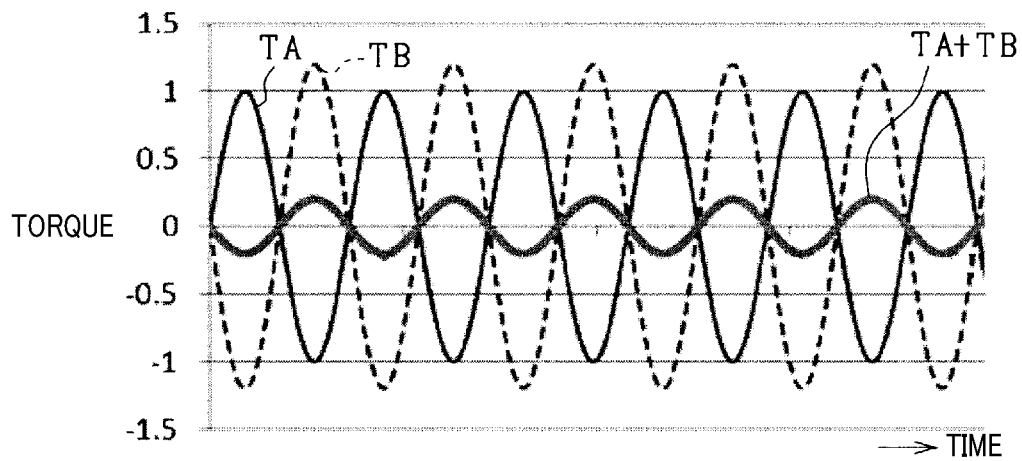

In addition, in practice, the amplitude of one of the torques TA and TB may become greater than the amplitude of the other of the torques TA and TB. For example, FIG. 14B illustrates a case where the amplitude of the torque TB is greater than the amplitude of the torque TA. In this case, it is still possible to reduce the torque ripple of the rotating electric machine 30.

Figure 14C:
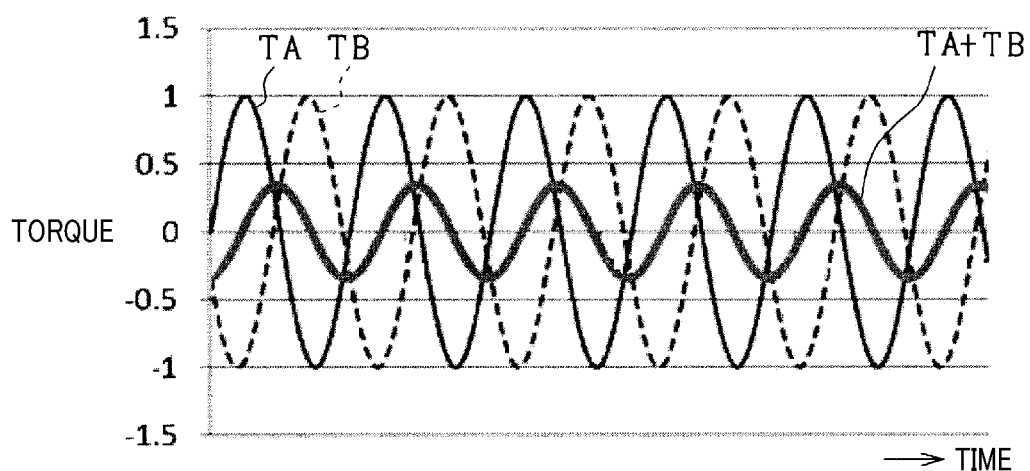
Figure 15:
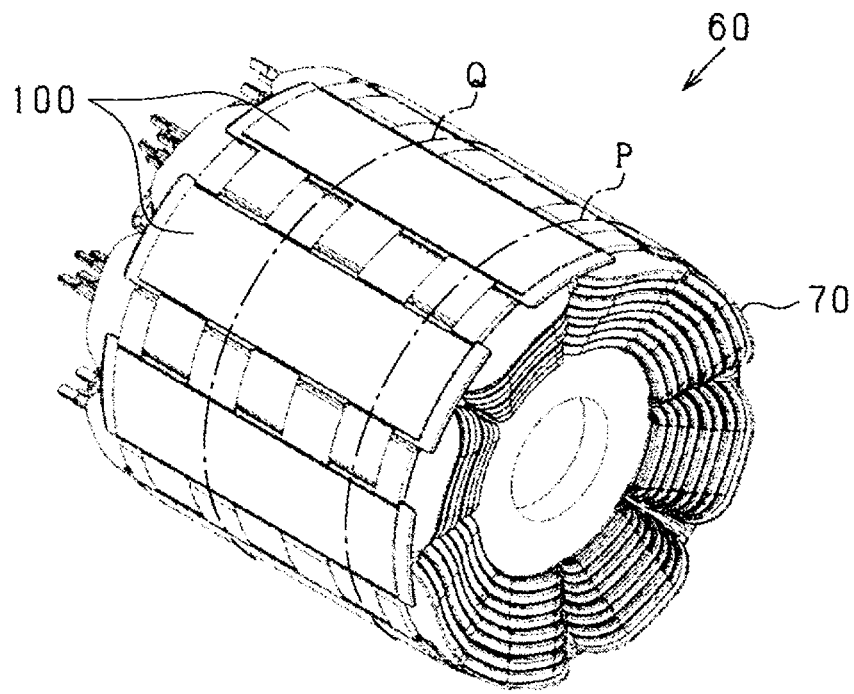
FIG. 15 is a perspective view of a rotor of a field coil type rotating electric machine according to a second embodiment.

Moreover, in practice, as shown in FIG. 14C, the difference in phase between the torques TA and TB may be deviated from β/2. In this case, if the difference in phase between the torques TA and TB is greater than β/3 and less than 2β/3, it is still possible to reduce the torque ripple of the rotating electric machine 30.

According to the present embodiment, it is possible to achieve the following advantageous effects.

In the present embodiment, the field coil type rotating electric machine 30 includes the stator 50 and the rotor 60. The stator 50 includes the stator core 51, the stator teeth 52 arranged in alignment with each other in the circumferential direction and each radially protruding from the stator core 51, and the stator coil 31 wound on the stator teeth 52. The rotor 60 includes the rotor core 61, the main poles 62 arranged in alignment with each other in the circumferential direction and each radially protruding from the rotor core 61 toward the stator 50 side, and the field coil 70 wound on the main poles 62. Moreover, each of the stator teeth 52 and the main poles 62 extends in the axial direction. Each of the main poles 62 has the pair of main-pole end portions 64a and 64b that are located respectively at opposite circumferential ends of the main pole 62 and both radially face the stator 50. For each of the main poles 62, in at least one of the main-pole end portions 64a and 64b of the main pole 62, there is formed at least one cut 65a or 65b for part of the axial length of the main pole 62. More particularly, in the present embodiment, in each of the main-pole end portions 64a and 64b, there are formed the plurality of first cuts 65a or second cuts 65b each extending for part of the axial length of the main pole 62.

With the above configuration, for each of the main-pole end portions 64a and 64b, it is possible to offset the timings at which those parts of the main-pole end portion where the cuts are formed radially face the slots of the stator 50 from the timings at which those parts of the main-pole end portion where no cuts are formed radially face the slots of the stator 50. Consequently, it becomes possible to have first torque ripple and second torque ripple canceled by each other; the first torque ripple is generated due to those parts of the main-pole end portion where the cuts are formed while the second torque ripple is generated due to those parts of the main-pole end portion where no cuts are formed. As a result, it becomes possible to reduce the torque ripple of the entire rotating electric machine 30.

Moreover, in the present embodiment, in each of the main-pole end portions 64a and 64b of the main poles 62, the total axial length of those parts of the main-pole end portion where the cuts are formed is set to be equal to the total axial length of those parts of the main-pole end portion where no cuts are formed. Consequently, it becomes possible to more effectively reduce the torque ripple of the rotating electric machine 30.

In the present embodiment, in each of the main poles 62, the circumferential width θnt of each of the first and second cuts 65a and 65b is set to satisfy the dimensional relationship of (⅓×β<θnt<⅔×β). More particularly, in the present embodiment, the circumferential width θnt is set to be equal to β/2. Consequently, it becomes possible to more effectively reduce the torque ripple of the rotating electric machine 30.

In the present embodiment, the field coil 70 is assembled to the main poles 62 from the radially outer side of the main poles 62 (i.e., the radial side of the main poles 62 facing the stator 50). The main poles 62 are arranged at equal intervals in the circumferential direction. Each of the main poles 62 is located circumferentially inside the field coil 70 wound thereon. With the above structure, it is possible to easily assemble the field coil 70 to the main poles 62.

In the present embodiment, in each of the main-pole end portions 64a and 64b of the main poles 62, each of those parts of the main-pole end portion where the cuts are formed is located in the axial direction between adjacent two of those parts of the main-pole end portion where no cuts are formed. Moreover, each of those parts of the main-pole end portion where no cuts are formed is located in the axial direction between adjacent two of those parts of the main-pole end portion where the cuts are formed. Consequently, it becomes possible to have the first torque ripple and the second torque ripple more suitably canceled by each other; the first torque ripple is generated due to those parts of the main-pole end portion where the cuts are formed while the second torque ripple is generated due to those parts of the main-pole end portion where no cuts are formed. As a result, it becomes possible to more effectively reduce the torque ripple of the entire rotating electric machine 30.

Second Embodiment

A field coil type rotating electric machine 30 according to the second embodiment has a similar configuration to the field coil type rotating electric machine 30 according to the first embodiment. Therefore, only the differences therebetween will be described hereinafter.

As shown in FIGS. 15-18, the field coil type rotating electric machine 30 according to the second embodiment further includes restricting members 100. The restricting members 100 are made of a non-magnetic material and configured to restrict radially outward movement of the field coil 70 due to the centrifugal force during rotation of the rotor 60. In addition, in FIG. 15, the field coil 70 is shown together with the restricting members 100.

Figure 16:
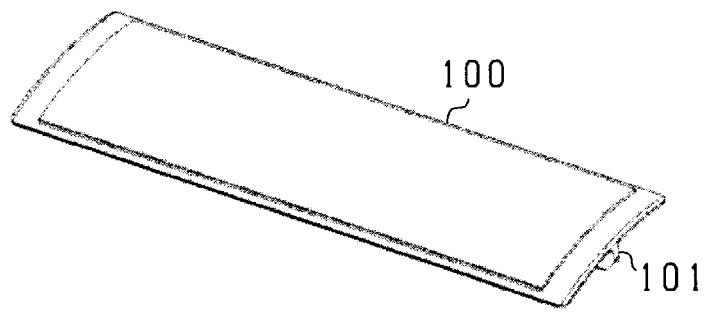
FIG. 16 is a perspective view of one of restricting members provided in the rotor of the field coil type rotating electric machine according to the second embodiment.

Specifically, in the present embodiment, each of the restricting members 100 is arranged between one circumferentially-adjacent pair of the main poles 62 and extends in the axial direction. As shown in FIG. 16, each of the restricting members 100 is shaped in a long plate and has an arcuate cross section perpendicular to its longitudinal direction. Consequently, each of the restricting members 100 is prevented from protruding radially outward from a radially outer peripheral surface of the rotor 60. Moreover, in each of the restricting members 100, there are formed ribs 101 to extend from a central part of the restricting member 100 so as to intersect one another.

Figure 17:
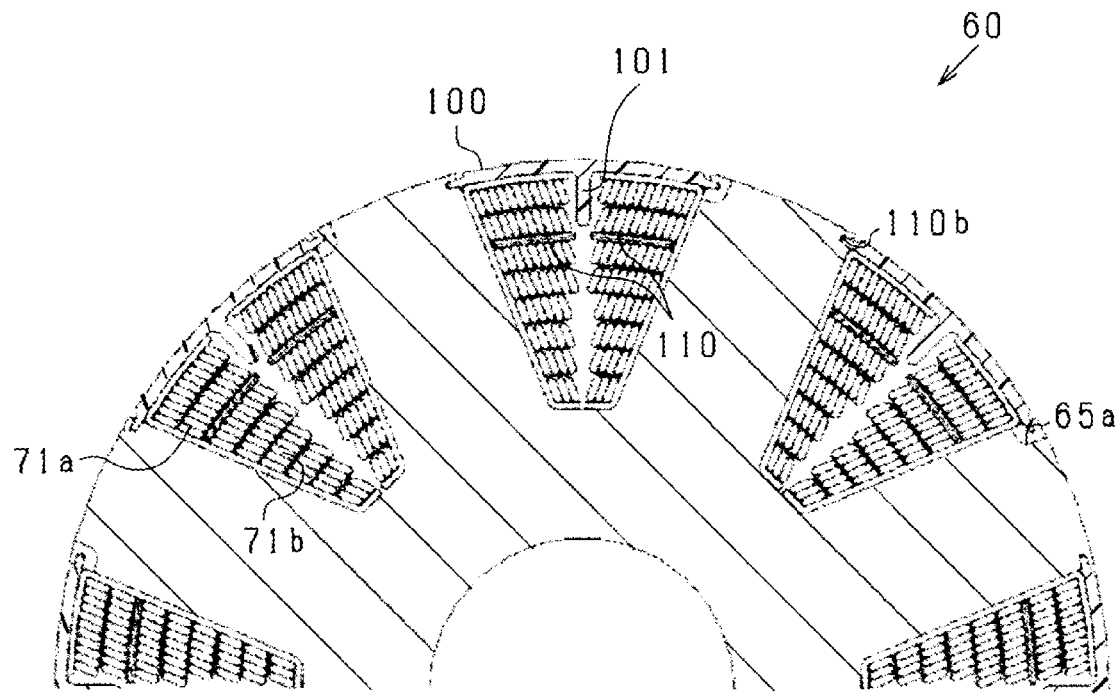
FIG. 17 is an enlarged cross-sectional view of a part of the rotor of the field coil type rotating electric machine according to the second embodiment.
Figure 18:
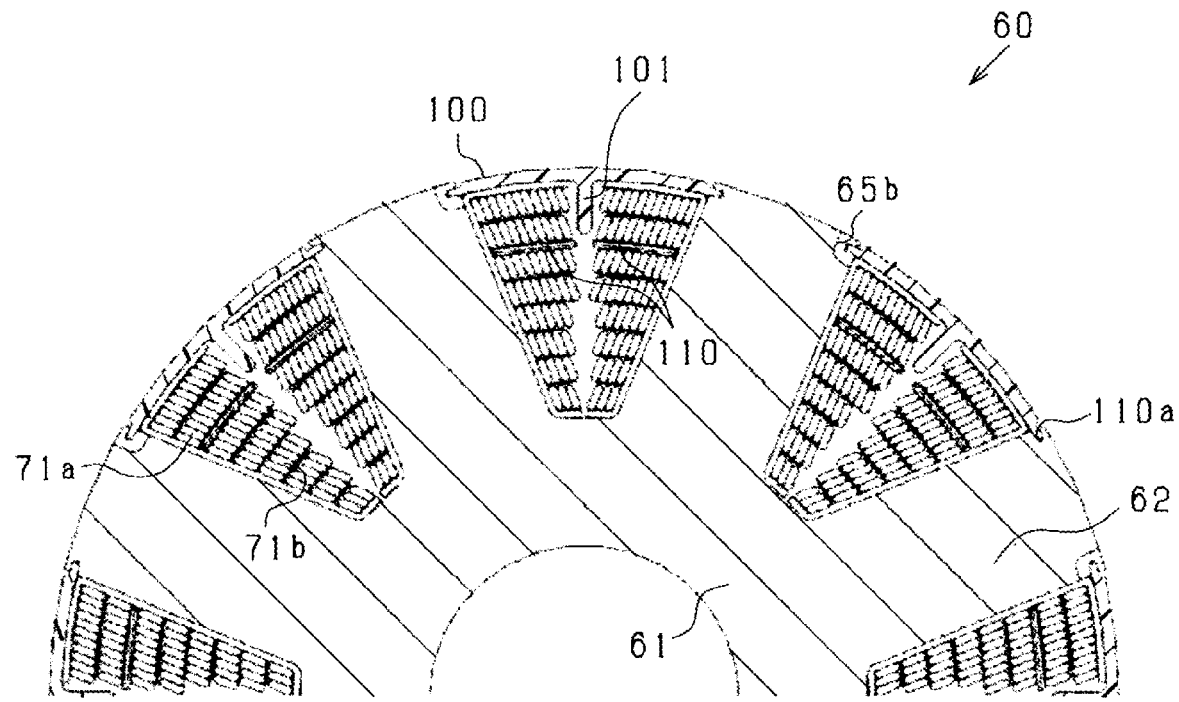
FIG. 18 is an enlarged cross-sectional view of another part of the rotor of the field coil type rotating electric machine according to the second embodiment.

Moreover, in the present embodiment, as shown in FIGS. 17 and 18, in the rotor 60, there are provided partitioning members 110 between the first and second windings 71a and 71b of the field coil 70; the partitioning members 110 are formed of a soft-magnetic material. Each of the partitioning members 110 is, for example, ring-shaped and has one of the main poles 62 inserted in a center hole thereof. Moreover, when viewed along the axial direction, each of the partitioning members 110 has an elongate shape extending in the circumferential direction. With the partitioning members 110 interposed between the first and second windings 71a and 71b of the field coil 70, the two windings 71a and 71b are radially separated from each other. In addition, the partitioning members 110 have a smaller radial thickness than each of the first and second windings 71a and 71b; the partitioning members 110 also have a larger circumferential length than each of the first and second windings 71a and 71b.

Moreover, each of the partitioning members 110 may be formed of a plurality of sheets that are made of a soft-magnetic material (e.g., magnetic steel) and laminated in a radial direction. With the above configuration, it is possible to lower eddy current loss in the partitioning members 110. In addition, with the sheets being laminated in the radial direction, it is possible to set the radial thickness of the partitioning members 110 to a small value according to the thickness of the sheets while securing the circumferential length of the partitioning members 110.

In the present embodiment, with the partitioning members 110 interposed between the first and second windings 71a and 71b of the field coil 70, most of the leakage magnetic flux flows through the partitioning members 110, not through the field coil 70. Consequently, it becomes difficult for voltages of opposite polarities to be induced respectively in the first and second windings 71a and 71b; it also becomes difficult for voltages of opposite polarities to be induced respectively in different parts of each of the first and second windings 71a and 71b. As a result, it becomes possible to increase electric current induced in each of the first and second windings 71a and 71b in each of the four patterns shown in FIG. 12.

FIG. 17 shows a transverse cross section of a part (designated by Q in FIG. 15) of the rotor 60 where the first cuts 65a are formed. On the other hand, FIG. 18 shows a transverse cross section of a part (designated by P in FIG. 15) of the rotor 60 where the second cuts 65b are formed.

As shown in FIG. 18, in circumferential side surfaces of those parts of the first main-pole end portions 64a where no first cuts 65a are formed, there are formed first grooves 110a each extending in the axial direction. Similarly, as shown in FIG. 17, in circumferential side surfaces of those parts of the second main-pole end portions 64b where no second cuts 65b are formed, there are formed second grooves 110b each extending in the axial direction. Each of the restricting members 100 has a first circumferential end portion inserted and fitted in the first grooves 110a of a corresponding one of the first main-pole end portions 64a and a second circumferential end portion inserted and fitted in the second grooves 110b of a corresponding one of the second main-pole end portions 64b; the corresponding first main-pole end portion 64a and the corresponding second main-pole end portion 64b are circumferentially adjacent to each other. In other words, each of the restricting members 100 has a pair of circumferential end portions fitted respectively in the first grooves 110a and the second grooves 110b of one circumferentially-adjacent pair of the first and second main-pole end portions 64a and 64b of the main poles 62. As a result, the restricting members 100 are mounted to the rotor 60.

As described above, in the present embodiment, the rotor 60 is arranged radially inside the stator 50. The rotor 60 further includes the restricting members 100 each of which extends in the axial direction and is arranged between one circumferentially-adjacent pair of the main poles 62 to restrict radially outward movement of the field coil 70. In the circumferential side surfaces of those parts of the first main-pole end portions 64a where no first cuts 65a are formed, there are formed the first grooves 110a each extending in the axial direction. In the circumferential side surfaces of those parts of the second main-pole end portions 64b where no second cuts 65b are formed, there are formed the second grooves 110b each extending in the axial direction. Each of the restricting members 100 has a pair of circumferential end portions fitted respectively in the first grooves 110a and the second grooves 110b of one circumferentially-adjacent pair of the first and second main-pole end portions 64a and 64b of the main poles 62.

With the above configuration, it is possible to easily and reliably mount the restricting members 100 to the rotor 60. Moreover, with the restricting members 100, it is possible to reliably restrict radially outward movement of the field coil 70 due to the centrifugal force during rotation of the rotor 60.

Furthermore, with the above configuration, it is possible to form the first grooves 110a and the second grooves 110b respectively in the first main-pole end portions 64a and the second main-pole end portions 64b alternately in the axial direction. Therefore, when the first cuts 65a and the second cuts 65b are formed respectively in the first main-pole end portions 64a and the second main-pole end portions 64b alternately in the axial direction, it is still possible to mount the restricting members 100 to the rotor 60. Consequently, during rotation of the rotor 60, it is possible to reduce the torque ripple of the rotating electric machine 30 while restricting radially outward movement of the field coil 70 due to the centrifugal force.

While the above particular embodiments have been shown and described, it will be understood by those skilled in the art that various modifications, changes, and improvements may be made without departing from the spirit of the present disclosure.

Figure 19:
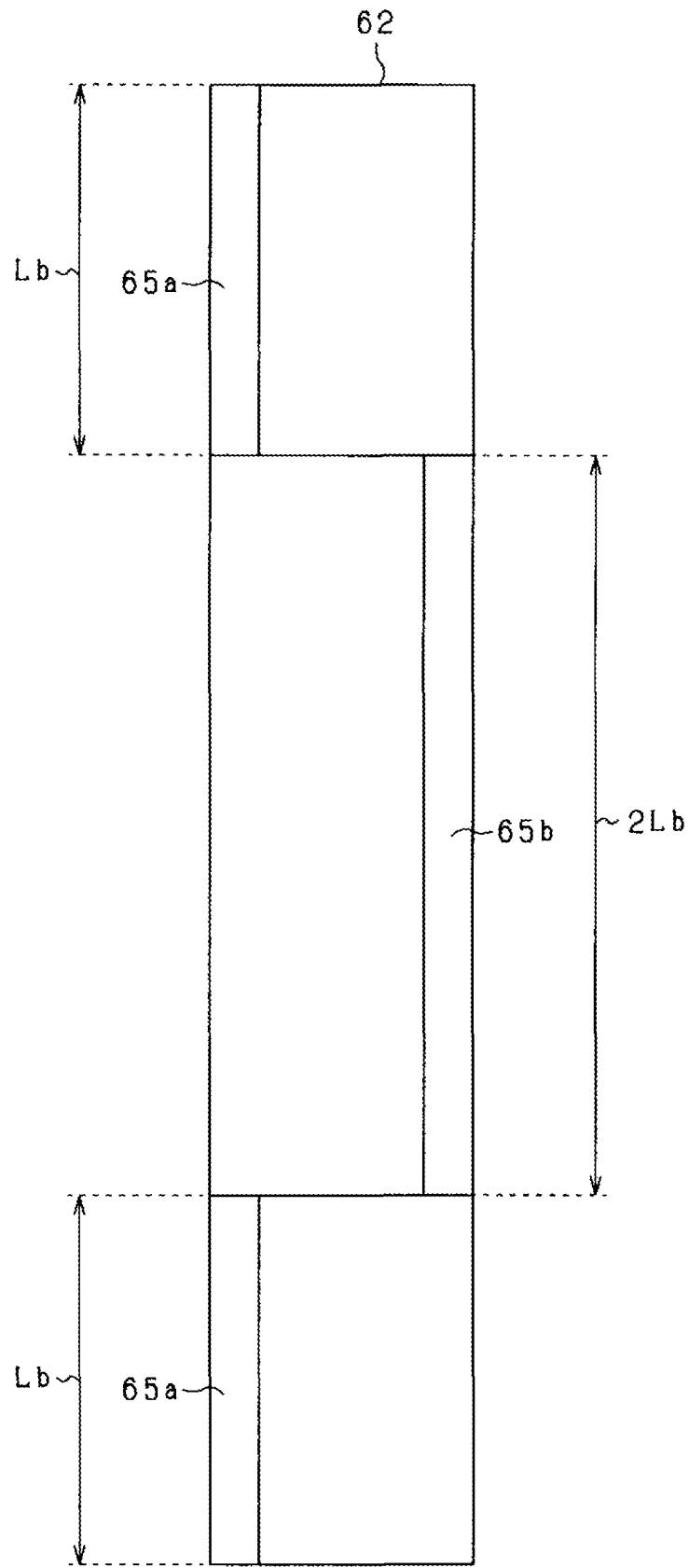
FIG. 19 is a schematic plan view illustrating the formation of cuts in each of main poles of a rotor of a field coil type rotating electric machine according to a modification.

(1) In the above-described embodiments, the first and second cuts 65a and 65b are formed in the first and second main-pole end portions 64a and 65b of the main poles 62 as shown in FIG. 7. However, the first and second cuts 65a and 65b may alternatively be formed in other manners, such as in a manner as shown in FIG. 19. Specifically, in the example shown in FIG. 19, in each of the main poles 62, two first cuts 65a are formed in the first main-pole end portion 64a while only one second cut 65b is formed in the second main-pole end portion 64b. Moreover, the total axial length (i.e., Lb+Lb=2Lb) of the two parts of the first main-pole end portion 64a where the two first cuts 65a are respectively formed is equal to the axial length (i.e., 2Lb) of the single part of the first main-pole end portion 64a where no first cut 65a is formed. Similarly, the axial length (i.e., 2Lb) of the single part of the second main-pole end portion 64b where the sole second cut 65b is formed is equal to the total axial length (i.e., Lb+Lb=2Lb) of the two parts of the second main-pole end portion 64b where no second cuts 65b are formed.

(2) In the above-described embodiments, in each of the first and second main-pole end portions 64a and 65b of the main poles 62, the total axial length of those parts of the main-pole end portion where the cuts are formed is set to be equal to the total axial length of those parts of the main-pole end portion where no cuts are formed. As an alternative, the total axial length of those parts of the main-pole end portion where the cuts are formed may be set to be approximately equal to the total axial length of those parts of the main-pole end portion where no cuts are formed. As another alternative, the total axial length of those parts of the main-pole end portion where the cuts are formed may be set to be different from the total axial length of those parts of the main-pole end portion where no cuts are formed. However, it should be noted that it is preferable to set the total axial length of those parts of the main-pole end portion where the cuts are formed to be substantially equal (i.e., exactly or approximately equal) to the total axial length of those parts of the main-pole end portion where no cuts are formed.

(3) In the above-described embodiments, in each of the main poles 62, the cuts are formed in each of the first and second main-pole end portions 64a and 64b. As an alternative, in each of the main poles 62, the cuts may be formed in only one of the first and second main-pole end portions 64a and 64b.

(4) In the above-described embodiments, the contours of the cuts are constant in shape in the axial direction. Alternatively, the contours of the cuts may vary in shape in the axial direction.

(5) In the above-described embodiments, each of the main poles 62 is configured so that those parts of the first main-pole end portion 64a where the first cuts 65a are formed do not axially overlap those parts of the second main-pole end portion 64b where the second cuts 65b are formed (see FIG. 7). However, each of the main poles 62 may alternatively be configured so that those parts of the first main-pole end portion 64a where the first cuts 65a are formed axially overlap those parts of the second main-pole end portion 64b where the second cuts 65b are formed.

Figure 20:
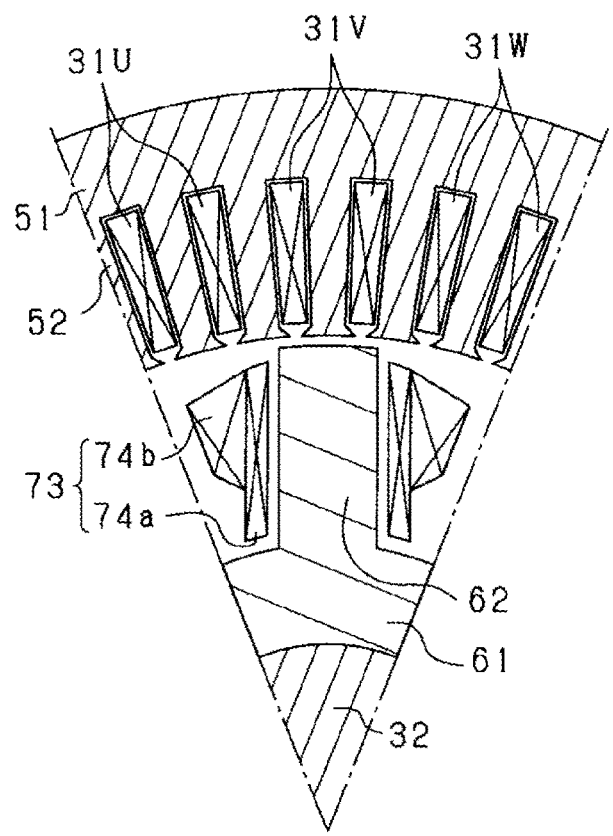
FIG. 20 is a transverse cross-sectional view of both part of a rotor and part of a stator of a field coil type rotating electric machine according to another modification.

(6) In the above-described embodiments, the rotor 60 includes the field coil 70 that is constituted of the first and second windings 71a and 71b as shown FIG. 3. However, the rotor 60 may include, instead of the field coil 70, a field coil 73 as shown in FIG. 20. The field coil 73 is constituted of a first winding 74a wound on each of the main poles 62 and a second winding 74b wound on the first winding 74a. Consequently, on each of the main poles 62, the first winding 74a is wound circumferentially inside the second winding 74b.

Figure 21:
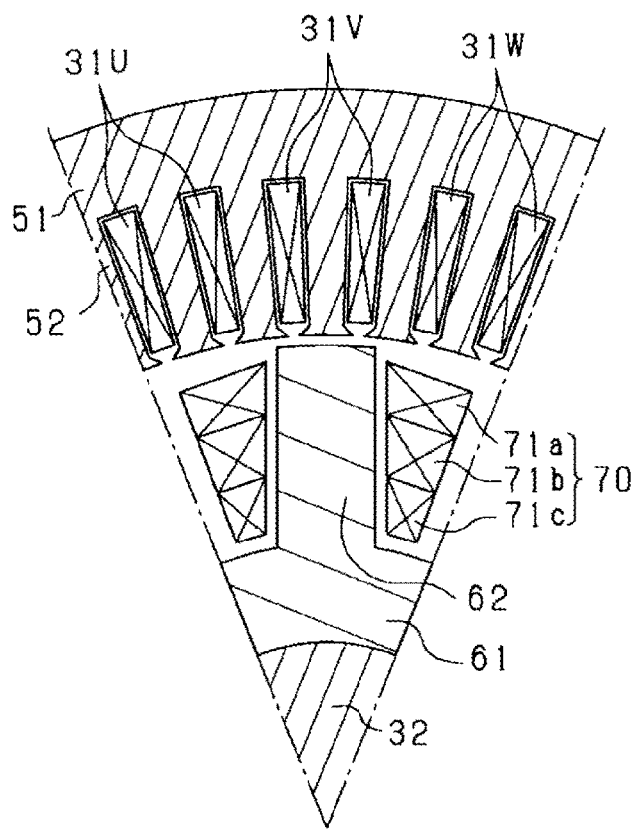
FIG. 21 is a transverse cross-sectional view of both part of a rotor and part of a stator of a field coil type rotating electric machine according to yet another modification.

(7) In the above-described embodiments, the field coil 70 is constituted of the first and second windings 71a and 71b that are connected in series with each other. However, the field coil 70 may alternatively be constituted of three or more windings that are connected in series with each other. For example, as shown in FIG. 21, the field coil 70 may further include a third winding 71c in addition to the first and second windings 71a and 71b. The third winding 71c is connected in series with the first and second windings 71a and 71b and wound on each of the main poles 62 so as to be located radially inside the second winding 71b.

(8) In the above-described embodiments, each of the first and second windings 71a and 71b of the field coil 70 may be formed of a rectangular conductor wire (i.e., an electrical conductor wire having a rectangular cross-sectional shape). In this case, it is possible to improve the space factor of the field coil 70, thereby improving the efficiency of the field coil type rotating electric machine 30. Moreover, in this case, adjacent portions of the first and second windings 71a and 71b of the field coil 70 are in surface contact with each other; consequently, when the centrifugal force is applied to the windings 71a and 71b, it is possible to lower the load acting between adjacent portions of the windings 71a and 71b, thereby preventing damage to insulating coats of the windings 71a and 71b. Furthermore, in this case, it is possible to improve the ampere-turn (AT) of the field coil 70, thereby broadening the excitation range of the field coil 70. As a result, it is possible to improve the torque controllability of the field coil type rotating electric machine 30.

(9) In the above-described embodiments, each of the first and second windings 71a and 71b of the field coil 70 may be constituted of an α winding of a rectangular conductor wire, such as one shown in FIG. 5(A) of Japanese Patent Application Publication No. JP 2008-178211 A.

(10) In the above-described embodiments, the rotating electric machine 30 is of an inner rotor type where the rotor 60 is arranged radially inside the stator 50. However, the rotating electric machine 30 may alternatively be of an outer rotor type where a rotor is arranged radially outside a stator. In this case, the rotor may include a rotor core and a plurality of main poles arranged in alignment with each other in the circumferential direction and each protruding radially inward from the rotor core.

(11) In the above-described embodiments, the rotating electric machine 30 is configured as a brushless rotating electric machine where the field coil 70 is supplied with the field current by supplying the harmonic currents to the phase windings 31U-31W of the stator coil 31. However, the rotating electric machine 30 may alternatively be configured as a brushed rotating electric machine where the field coil 70 is supplied with the field current via brushes.

(12) In the above-described embodiments, the field coil 70 is formed of aluminum wires. However, the field coil 70 may alternatively be formed of other materials, such as copper wires or CNTs (Carbon Nanotubes).

(13) In the above-described embodiments, the field coil 70 is formed by compression shaping. Alternatively, the field coil 70 may be formed without compression shaping.

What is claimed is:

1. A field coil type rotating electric machine comprising:
   a stator including a stator core, a plurality of stator teeth spaced in a circumferential direction, each of the plurality of stator teeth radially protruding from the stator core, and a stator coil wound on the plurality of stator teeth; and
   a rotor including a rotor core, a plurality of main poles spaced in the circumferential direction, each of the plurality of main poles radially protruding from the rotor core toward the stator, and a field coil wound on the plurality of main poles,
   wherein
   each of the plurality of stator teeth and the plurality of main poles extends in an axial direction of the stator core and the rotor core,
   each of the plurality of main poles has a pair of main-pole end portions that are located at opposite circumferential ends of the each of the plurality of main poles and radially face the stator,
   each of the pair of main-pole end portions has a plurality of spaced cut-forming parts having a cut and a plurality of spaced non-cut-forming parts that do not have a cut,
   each of the plurality of spaced cut-form parts alternate with ones of the plurality of spaced non-cut-forming parts in the axial direction, and
   a total axial length of the plurality of cut-forming parts is substantially equal to a total axial length of the plurality of non-cut-forming parts.

2. The field coil type rotating electric machine as set forth in claim 1, wherein the field coil type rotating electric machine has a structure such that the field coil is assembled to the plurality of main poles from a radial side of the plurality of main poles facing the stator,
   the plurality of main poles are at equal intervals in the circumferential direction, and
   the each of the plurality of main poles is circumferentially inside the field coil wound thereon.

3. A field coil type rotating electric machine comprising:
   a stator including a stator core, a plurality of stator teeth spaced in a circumferential direction, each of the plurality of stator teeth radially protruding from the stator core, and a stator coil wound on the plurality of stator teeth; and a rotor including a rotor core, a plurality of main poles spaced in the circumferential direction, each of the plurality of main poles radially protruding from the rotor core toward the stator, and a field coil wound on the plurality of main poles, wherein each of the plurality of stator teeth and the plurality of main poles extends in an axial direction of the stator core and the rotor core, each of the plurality of main poles has a pair of main-pole end portions that are located at opposite circumferential ends of the each of the plurality of main poles and radially face the stator, for the each of the plurality of main poles, in at least one of the pair of main-pole end portions, there is at least one cut for part of an axial length of the each of the plurality of main poles, and $1/3 \times \beta < \theta nt < 2/3 \times \beta$, where $\beta$ is one slot pitch of the stator and $\theta nt$ is a circumferential width of the at least one cut.

4. The field coil type rotating electric machine as set forth in claim 3, wherein $\theta nt = \beta/2$.

5. The field coil type rotating electric machine as set forth in claim 3, wherein the field coil type rotating electric machine has a structure such that the field coil is assembled to the plurality of main poles from a radial side of the plurality of main poles facing the stator, the plurality of main poles are at equal intervals in the circumferential direction, and the each of the plurality of main poles is circumferentially inside the field coil wound thereon.

6. A field coil type rotating electric machine comprising:

a stator including a stator core, a plurality of stator teeth spaced in a circumferential direction, each of the plurality of stator teeth radially protruding from the stator core, and a stator coil wound on the plurality of stator teeth; and a rotor including a rotor core, a plurality of main poles spaced in the circumferential direction, each of the plurality of main poles radially protruding from the rotor core toward the stator, and a field coil wound on the plurality of main poles, wherein each of the plurality of stator teeth and the plurality of main poles extends in an axial direction of the stator core and the rotor core, each of the plurality of main poles has a pair of main-pole end portions that are located at opposite circumferential ends of the each of the plurality of main poles and radially face the stator, for the each of the plurality of main poles, in at least one of the pair of main-pole end portions, there is at least one cut for part of an axial length of the each of the plurality of main poles, the rotor is radially inside the stator, the rotor further includes a plurality of restricting members each of which extends in the axial direction and is arranged between one circumferentially-adjacent pair of the main poles to restrict radially outward movement of the field coil, for each of the plurality of main-pole end portions, there is an axially-extending groove in a circumferential side surface of a part of the each of the pair of main-pole end portions where no cut is formed, and each of the plurality of restricting members has a pair of circumferential end portions fitted in the grooves of one circumferentially-adjacent pair of the main-pole end portions.

7. The field coil type rotating electric machine as set forth in claim 6, wherein the field coil type rotating electric machine has a structure such that the field coil is assembled to the plurality of main poles from a radial side of the plurality of main poles facing the stator, the plurality of main poles are at equal intervals in the circumferential direction, and the each of the plurality of main poles is circumferentially inside the field coil wound thereon.

8. A field coil type rotating electric machine comprising:

a stator including a stator core, a plurality of stator teeth spaced in a circumferential direction, each of the plurality of stator teeth radially protruding from the stator core, and a stator coil wound on the plurality of stator teeth; and a rotor including a rotor core, a plurality of main poles spaced in the circumferential direction, each of the plurality of main poles radially protruding from the rotor core toward the stator, and a field coil wound on the plurality of main poles, wherein each of the plurality of stator teeth and the plurality of main poles extends in an axial direction of the stator core and the rotor core, each of the plurality of main poles has a pair of main-pole end portions that are located at opposite circumferential ends of the each of the plurality of main poles and radially face the stator, for the each of the plurality of main poles, in at least one of the pair of main-pole end portions, there is at least one cut for part of an axial length of the each of the plurality of main poles, and for each of the plurality of main poles, the at least one cut is in each of the pair of main-pole end portions, in each of the pair of main-pole end portions, one part of the each of pair of main-pole end portions does not include the at least one cut in the axial direction, the one part is between two of the at least one cut, the rotor is radially inside the stator, the rotor further includes a plurality of restricting members each of which extends in the axial direction and is arranged between one circumferentially-adjacent pair of the main poles to restrict radially outward movement of the field coil, for each of the pair of main-pole end portions, there is an axially-extending groove in a circumferential side surface of a part of the each of the pair main-pole end portions where no cut is formed, and each of the plurality of restricting members has a pair of circumferential end portions fitted in the grooves of one circumferentially-adjacent pair of the main-pole end portions.

9. The field coil type rotating electric machine as set forth in claim 8, wherein the field coil type rotating electric machine has a structure such that the field coil is assembled to the plurality of main poles from a radial side of the plurality of main poles facing the stator, the plurality of main poles are at equal intervals in the circumferential direction, and the each of the plurality of main poles is circumferentially inside the field coil wound thereon.

\* \* \* \* \*